Patented July 13, 1954

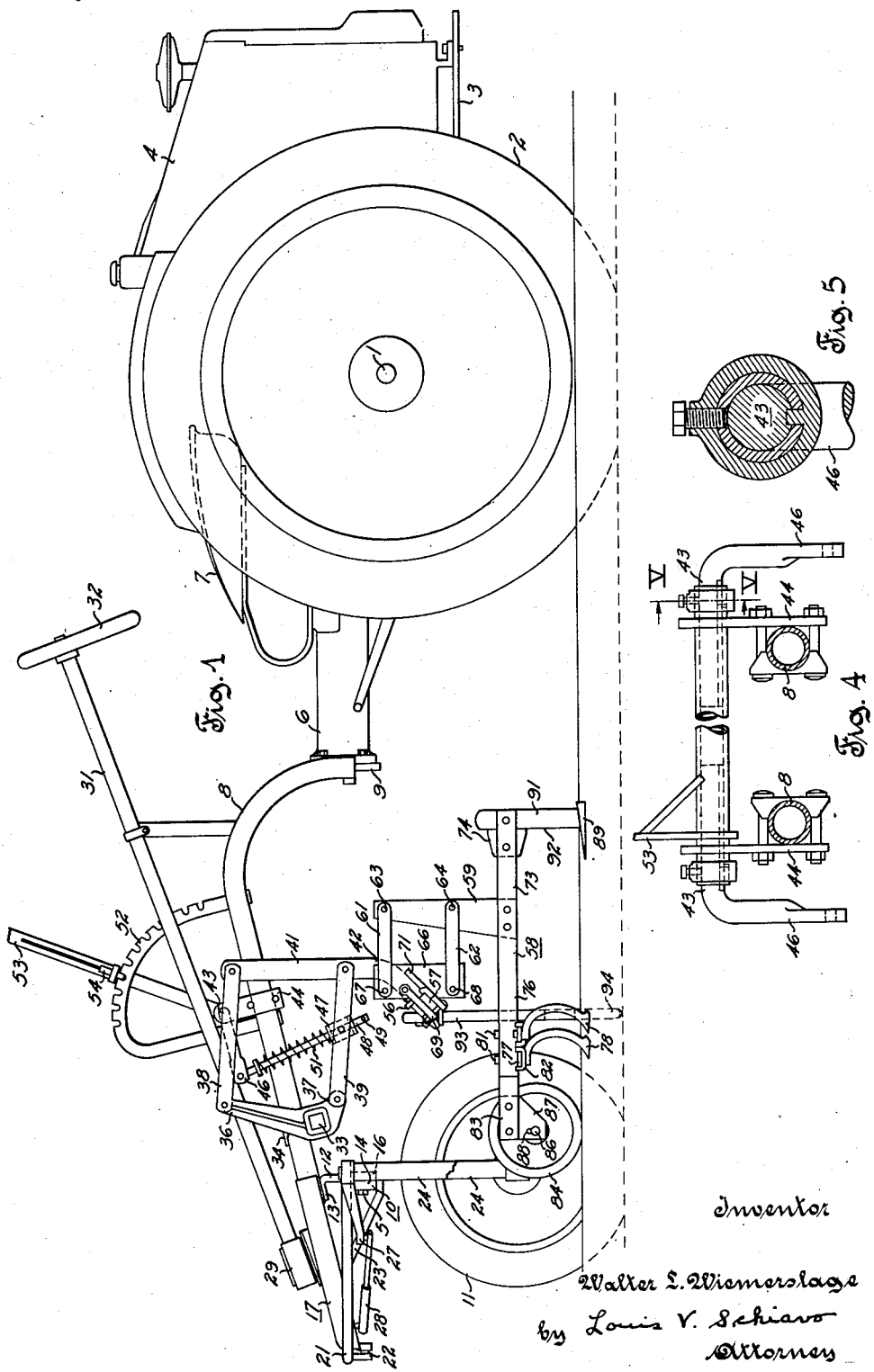

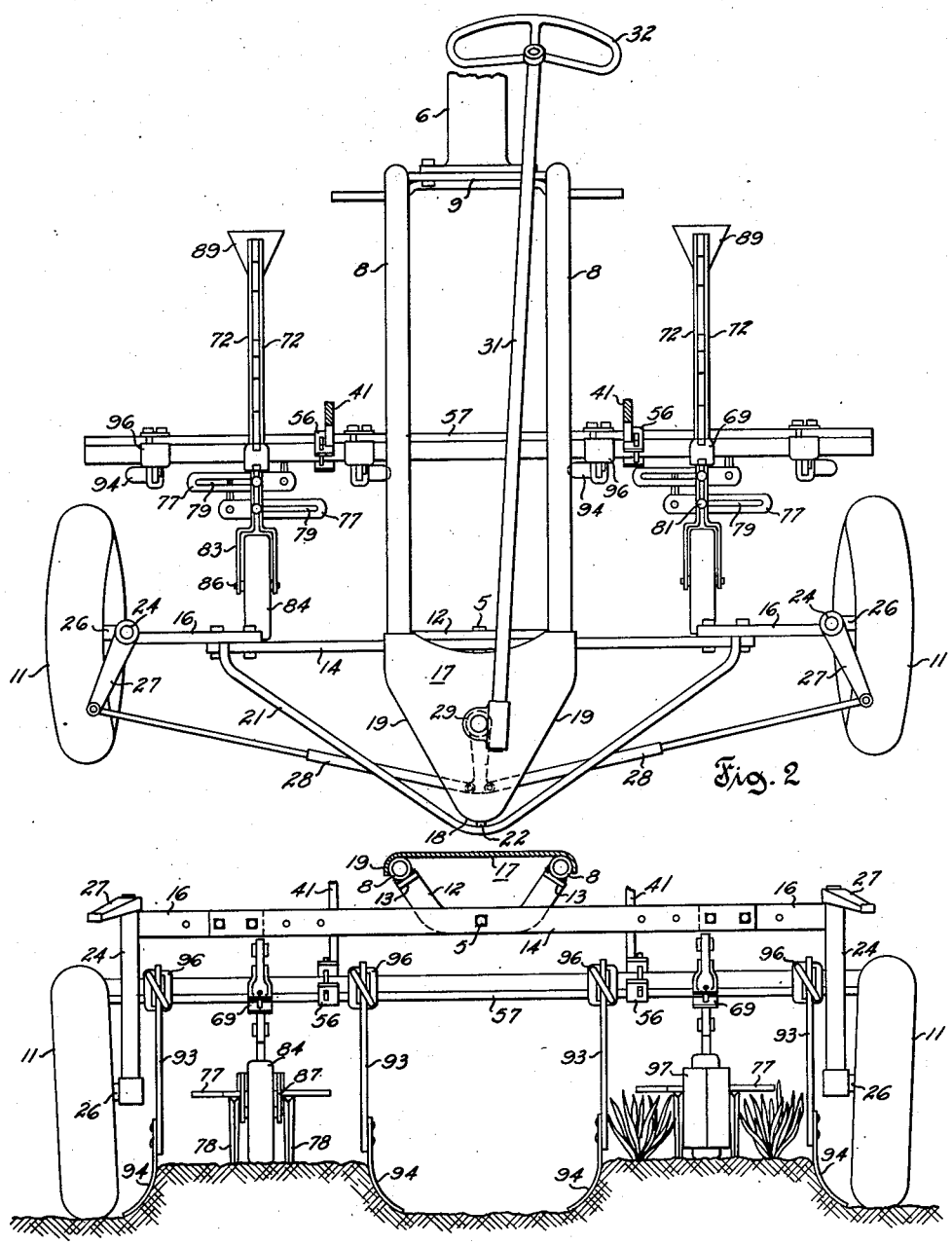

2,683,405

UNITED STATES PATENT OFFICE 2,683,405

CULTIVATOR AND BED SHAVER ARRANGEMENT FOR TRACTORS

Walter L. Wiemerslage, La Crosse, Wis., assignor to Allis-Chalmers Manufacturing Company, Milwaukee, Wis., a corporation of Delaware Application September 20, 1948, Serial No. 50,064

5 Claims. (Cl. 97—47.43)

This invention relates generally to vehicle propelled implements and is more particularly concerned with and has as an object the mounting of an implement on any suitable traveling support, hereinafter referred to as a tractor, so that the working depth of at least one tool is effectively gauged by variations in the ground surface traveled by a dirigible tractor support and so that the working depth of at least one other tool is effectively and independently gauged by variations in the ground surface laterally of said dirigible support.

In the cultivation of row crops planted in generally flat-topped beds separated by a ditch or furrow therebetween, it has heretofore been customary to mount a tool rig in underslung relation to the tractor, the tool rig including weeding knives, bed shavers, and an element, such as a wheel, adjustably secured to the rig and arranged to travel on the top surface of the bed for gauging the working depth of both the weeding knives and bed shavers. However, these prior arrangements have not been entirely satisfactory as the depth of the separating furrow usually varies considerably, and, as a result, the bed shavers either dig into the bottom of the furrow or trim or shave only a portion of the side wall of the bed. These results are undesirable and should be avoided since the digging action of the bed shavers frequently raises the rig relative to the tractor, thus negativing the effect of the rig carried gauge element and making it extremely difficult, if not impossible, to maintain a uniform depth of weeding knife soil penetration, and since failure to properly shave or trim the side walls of a bed permits water flowing in the separating furrow, whether it be for drainage or irrigation purposes, to more readily erode or otherwise undermine the side walls of the bed and cause the overlying portions of the bed to break away and fall into the furrow, thus decreasing the depth of the adjacent portion thereof and/or eventually destroying the top surface of the bed.

The principal object of the present invention is to provide an improved tractor propelled bed cultivating and shaving machine; and more particularly one wherein weeding knives or other bed cultivating tools are positioned to work the top surface of a bed between ditches; wherein one or more bed shaving tools are positioned to work the sides of said bed, and wherein the bed top cultivating tools are gauged automatically and independently of the bed shaving tools in accordance with vertical undulations of said bed top surface.

A further object of the invention is to provide an improved bed cultivating and shaving machine of the above mentioned character wherein the bed shaving tools are subject to gauging by the tractor front wheels in accordance to vertical undulations of the ditch bottom surfaces traveled by the tractor wheels.

A further object of the invention is to provide an improved bed cultivating and shaving machine of the above mentioned character wherein the working positions of the bed cultivating tools and of the bed shaving tools are adjustable independently of each other.

A still further object of the invention is to provide an improved bed cultivating and shaving machine of the above mentioned character which lends itself to work simultaneously on two or more beds and wherein the working positions of all of the bed shaving tools may be simultaneously adjusted without affecting the adjusted positions of the bed cultivating tools.

Additional objects and advantages will become readily apparent as the disclosure progresses and particularly sets forth the construction and operation of an illustrative apparatus embodying the invention. And, accordingly, the present invention may be considered as comprising the various constructions and combinations hereinafter more fully set forth in the detailed description and appended claims, reference being had to the accompanying drawing, in which:

Fig. 1 is a side view of an illustrative tractor implement combination with the near side front wheel and bed shaver removed;

Fig. 2 is a plan view of the forward portion of the tractor implement combination shown in Fig. 1 with parts omitted in the interest of clarity;

Fig. 3 is a front view of the tractor implement combination, shown in Fig. 2, with additional parts omitted to better show the general arrangement of the various tools;

Fig. 4 is an enlarged view illustrating in detail a construction affording lateral adjustment of the implement support lift arm; and Fig. 5 is an enlarged section taken on line V—V of Fig. 4.

Referring now more particularly to the drawings, I have shown my invention as applied in the cultivation of row crops planted in generally flat-topped beds formed by ditches or furrows therebetween. The tractor element of the combination has a rear axle structure 1 mounting a pair of laterally spaced ground engaging traction wheels 2 at opposite ends thereof. A rearwardly projecting frame part 3 mounts the engine 4 in rearwardly overhung relation with respect to axle structure 1, and a tubular frame part 6 extends forwardly from axle structure 1 to mount an operator's seat 7 in elevated relation thereto immediately in advance of engine 4. A pair of laterally spaced upwardly arched tubular frame members 8 have their rear ends rigidly united with a transverse part 9 which, in turn, is fixedly secured to the forward end of central frame part 6. The transverse front axle structure 10 is secured to forward end portions of tubular frame members 8 and supported on a pair of laterally spaced dirigible front wheels 11. It is to be understood, of course, that the tractor is provided with the usual operator actuated controls (not shown).

The front axle structure includes a U-shaped bar 12 having legs terminating in forwardly turned portions 13 which are rigidly secured beneath forward end portions of the tubular frame members 8, bar 12 being transversely disposed thereby in depending bracing relation to said members. A rigid elongated bar 14 is pivotally connected to bar 12, as by a pin element 5, and is positioned thereby in forward side abutting relation to the bight thereof for vertical swinging movement about a horizontal axis extending centrally longitudinally of the tractor. Similar bar members 16 are detachably secured in abutting relation to the rear sides of the opposite end portions of bar 14 for selective adjustment longitudinally thereof so as to vary the tread spacing of the front wheels 11. The forward end portions of tubular frame members 8 are additionally braced by a rigid generally triangular shaped plate member 17 having its apex or forward end portion and also opposite side portions thereof turned down to form front and side walls 18 and 19, respectively, the rear end portions of walls 19 side abutting the forward end portions of tubular frame members 8 and being welded or otherwise fixedly secured thereto. Bar 14 is also braced by a curved rod 21 having its midportion pivotally connected with the apex portion of plate member 17 at 22 and having bifurcated opposite end portions 23 fixedly connected, as by welding, with the top and bottom edges of the outer portions of bar 14. It is to be understood that the axes of the pivots 5 and 22 are coaxially related to allow free vertical swinging movement of the front axle structure. The outer end of each bar member 16 mounts a wheel standard 24 in depending relation thereto for pivotal movement about a vertical axis. The lower extremities of standards 24 each present an outwardly extending spindle 26 rotatably mounting a front wheel 11 while the upper ends of these standards are provided with arms 27 operatively connected through similar telescoping links 28 with a worm gear steering mechanism 29 for effecting simultaneous turning movement of front wheels 11. It is to be understood that the steering mechanism includes a rearwardly extending shaft 31 which mounts a steering wheel 32 disposed within easy reach of an operator sitting at station 7.

A rigid transverse cross bar 33 is secured to the underside of the forward portions of tubular frame members 8, immediately to the rear of triangular plate member 17, by means of suitable clamps 34. Bar 33 is generally parallel to the transverse axle bar 14 and preferably projects equal distances to either side of the frame members 8. A similar hanger member is secured on each end portion of bar 33 for adjustment longitudinally thereof, and presents an upwardly extending arm 36 and a depending arm 37. The upper arm 36 of each hanger pivotally mounts a rearwardly extending link 38, and the lower arm 37 of each hanger pivotally mounts a rearwardly extending link 39. The rear ends of upper and lower links 38 and 39, respectively, are pivotally connected with vertically spaced portions of a rigid link 41 which extends beneath lower link 39 and terminates in a forwardly projecting end portion 42 having a clamp means associated therewith for the reception of a rectangular tool frame bar. It is to be understood that the laterally spaced hangers, one on each side of the tractor, are in transverse alignment relative to the longitudinal axis of the tractor, and that the clamp means depending therefrom are similarly aligned. A transverse rock shaft 43 is rotatably mounted on the top side of tractor frame members 8 by means of a pair of brackets 44 secured to the latter in any suitable manner. Rock shaft 43 is disposed in generally parallel relation to bars 14 and 33 and has its opposite end portions similarly bent at a right angle to its longitudinal axis so as to form crank or lift arms 46 positioned in forwardly and downwardly extending relation with respect to the main portion of this shaft and generally alongside the inner or tractor side of the adjacent upper link 38. Preferably shaft 43 is a fabricated structure comprising a tubular main element telescopically receiving separate crank elements (note Fig. 4) for selectively positioning arms 46 to conform with any selected adjustment of the similar hanger member mounted on bar 33. The free end of each lift arm 46 has an operative lost motion connection with an intermediate portion of the adjacent one of the links 39, this connection being a well known type comprising a pivot block 47, a lift rod 48 slidably extending through block 47, a pin 49 preventing withdrawal of rod 48 from block 47, and a compression spring 51 surrounding the intermediate portion of rod 48. A notched quadrant 52 and a lever 53 mounting a quadrant engaging latch 54 are operatively associated with rock shaft 43 for actuating and maintaining this shaft in any selected position to thereby adjust the vertical position of clamp means 56 relative to the frame members 8. Preferably lever 53 extends rearward to a point within easy reach of an operator seated at station 7. It should now be obvious that parts 56 may be considered as underslung vertically adjustable implement supports.

An elongated rigid draft bar 57, rectangular in cross section, is mounted on supports 56 for movement therewith and positioned thereby to extend transversely of the tractor in underslung relation thereto and in symmetrical relation relative to the longitudinal axis of the tractor. A pair of similar tool rigs are detachably mounted on outer portions of draft bar 57 so as to travel centrally between two crop rows planted on the top surface of adjacent beds separated by a ditch or furrow therebetween, as best shown in Fig. 3. Each rig comprises an elongated tool frame 58 having a rigid upstanding plate like part 59 disposed intermediate the ends thereof, a pair of fabricated links 61 and 62 having their rear ends pivotally connected with vertically spaced portions 63 and 64 of part 59, and a rigid plate like part 66 having vertically spaced pivot mountings 67 and 68 connected with and supporting the forward ends of links 61 and 62. These links are of substantially equal length, and the vertical spacing of their points of pivotal connection with rigid parts 59 and 66 are preferably such as to form a parallel linkage. An intermediate portion of parts 66, that is, a portion intermediate the pivot mountings 67 and 68 is provided with a forwardly projecting clamp means 69 detachably securing the tool rig to the draft bar 57 for adjustment along the longitudinal axis thereof. It should be readily apparent that links 61 and 62 afford a vertical movement of rigid part 59 relative to part 66 and that, conversely, these links also afford a vertical movement of draft bar 57 and part 66 relative to part 59. Also, it should be apparent that the extent to which parts 56 and draft bar 57 can be moved vertically upward relative to part 59 is necessarily limited since in order to effectively raise the tool rig or rigs by actuation of lever 53, the support therefor must be capable of picking up and lifting the rig or rigs clear of the ground a sufficient distance practical for all purposes of normal use, including transport purposes. In the construction herein shown, this is accomplished by providing rigid part 66 with a projection 71 positioned to engage the underside of link 61 as draft bar 57 and part 66 are moved vertically upward a predetermined distance relative to part 59.

Tool frame 58 is formed of bar stock and comprises a pair of similar bars 72 which are fixedly bolted or otherwise secured to opposite sides of the lower portion of rigid plate-like part 59 in side abutting parallel relation thereto. Bars 72 have a portion 73 extending to the rear of part 59 in uniformly spaced parallel relation as determined by the thickness of part 59 and by a spacer plate 74 of like thickness. Bars 74 also have a portion 76 extending forwardly of part 59 in the above mentioned uniformly spaced relation a distance sufficient to mount thereon a pair of laterally extending tool bars 77 each carrying a depending ground working tool 78.

Tool bars 77 are rectangular in transverse cross section and each has a longitudinal slot 79 therethrough for adjustably attaching same to frame 58, the attaching means comprising a bolt 81 which passes between frame bars 72, and a coacting clamping part 82 which receives bolt 81 and engages the underside of the tool bar. The particular manner of tool bar attachment is not of particular significance and a further description of this feature is deemed unnecessary for a complete understanding of the present invention. However it should be understood that each tool bar is adjustable laterally relative to the longitudinal axis of frame 58.

The forward portions of frame bars 72 are oppositely laterally offset to form a bifurcated front end 83. A gauge wheel 84 is disposed in the space between the bifurcations and is rotatably supported on a transverse boltlike spindle or shaft 86 carried by depending platelike hangers 87 bolted or otherwise secured to the inner opposite sides of the bifurcated front end 83. Hangers 87 are provided with aligned vertical slots 88 therethrough receiving boltlike shaft 86, the latter being vertically adjustable in slots 88 to thereby vertically vary the position of the gauge wheel relative to frame 58. The rear frame portion 73 mounts a ground working tool 89 having an upstanding shank 91, rectangular in transverse cross section, which is firmly clamped between frame portions 73 with its forward edge 92 abutting the vertical rear edge of spacer plate 74.

Also mounted on draft bar 57 are four bed shaving tools each comprising a shank 93 and a depending blade 94, the shank portion of the tool being secured to draft bar 57 for adjustment longitudinally thereof by means of a known type clamp connector 96. These tools are arranged in pairs and the tools of each pair are laterally spaced apart a distance approximately equal to the width of the top surface of a bed and the blades 94 are shaped and mounted on shank portions 93 so as to conform with and scrape the opposite sides or shoulders of the bed therebetween. If desired, the forward portion of each tool frame 58 may be provided with a shield 97 enclosing the forward side of the gauge wheel.

As previously indicated, draft bar 57 is mounted on a pair of vertically adjustable underslung supports 56 carried by substantially parallel links 38 and 39, the latter having a well known type of lost motion connection, including a compression spring 51, with lift arms 46. Therefore, if the bed shaving tools be suitably mounted on draft bar 57 and lever 53 be moved to a position whereby the tool rigs are free to float or swing vertically relative to bar 57 and independently of each other in conformity with vertical undulations in the top surface of the beds and whereby the bed shaving blades are positioned to shave the entire sides of the beds, then the above mentioned spring will be compressed to some such extent as indicated in Fig. 1.

Depending on the condition of the soil and on the magnitude of the pressure of spring 51, the bed shaving tools 94 may occupy the working positions in which they are shown in Figs. 1 and 3, or they may rise or fall from those positions during advance movement of the tractor. Falling movement of the bed shaving tools will be limited by engagement of block 47 with pin 49, and in that limit condition travel of the tractor wheels 11 on vertically undulating ditch bottom surfaces will cause corresponding up and down movements of the draft bar 57 and its associated bed shaving tools relative to the top surfaces of the beds underlying the draft bar. Rise and fall of the bed shaving tools 94 as the depth of the wheel traveled ditch or furrow varies, insures a complete shaving of the sides of the beds independently of the floating action of the tool rig running between the crop rows in the top of the bed. Furthermore, it will be seen that forward or rearward actuation of lever 53 by the operator results respectively in lowering or elevating supports 56, which mount draft bar 57 for movement therewith. And, since the bed shaving tools are fixedly attached to draft bar 57 for movement therewith, it should be apparent that these tools are likewise vertically adjustable through operation of lever 53. It will also be seen that the depth to which the top of the beds is worked depends on the vertical spacing of gauge wheel spindle 86 relative to tool frame 58, and that this spacing may be varied materially (providing the lower edge of upper link 61 is not engaged with or just about to engage stop projection 71) by adjusting the position of gauge wheel spindle 86 in the aligned vertical slots 88 in hangers 87. Since, as previously indicated, tool frame 58 is attached to draft bar 57 through parallel linkage 61 and 62 affording relative vertical movement between the draft bar and part 59, it should be apparent that normally, that is, so long as the bottom edge of link 61 does not engage the projection 71 on part 66, the bed shaving tools are vertically adjustable over a fairly wide range without affecting the working depth of the tools positioned to work the top surface of the bed, and that normally the working depth of the bed working tools last mentioned is adjustable over a fairly wide range without affecting the vertical position of the bed shaving tools.

It should be obvious that although the apparatus herein disclosed as embodying the invention has particular utility in the planting and cultivation of vegetable crops, certain features are of more general application and that, therefore, it is not intended to limit the invention to the exact construction and combination herein shown and described for purposes of illustration as various modifications within the scope of the appended claims may occur to persons skilled in the art.

It is claimed and desired to secure by Letters Patent:

1. A bed cultivating and shaving machine comprising, in combination, a tractor mounting a pair of dirigible front wheels laterally spaced apart to travel in generally parallel ditches bounding one or more row crop beds underlying said tractor, an elongated draft member carried by a portion of said tractor adjacent the mounting of said wheels and positioned to extend laterally beneath said tractor portion in generally parallel relation to the axes of said wheels and in vertically spaced relation to the top surface of a bed between said ditches, a pair of bed shaving tools mounted on said draft member in vertically fixed depending positions and in laterally spaced relation with respect to each other for trimming the side walls of said bed, a tool rig frame positioned intermediate said pair of bed shaving tools and suspended from said draft member through means affording vertical floating movement of said frame relative to said draft member, one or more bed working tools mounted on said frame in vertically fixed relation thereto and positioned thereby between and in laterally spaced relation to said bed shaving tools, and a gauge element secured to said frame in contacting relation to said bed top surface and generally in the line of travel of said bed working tools, so that the working depth of said bed working tools will be gauged automatically and independently of said draft member and bed shaving tools in accordance with vertical undulations of said bed top surface.

2. A bed cultivating and shaving machine comprising, in combination, a tractor mounting a pair of laterally spaced dirigible wheels supporting the front end thereof, a pair of implement supports depending in laterally aligned relation from a portion of said tractor adjacent the mounting for said wheels, a rigid draft bar secured to said supports and extending transversely beneath said tractor to points adjacent the rear of said wheels so that travel of said wheels on vertically undulating ditch bottom surfaces will cause up and down movement of said draft bar relative to the top surface of a bed underlying said draft bar, a pair of bed shaving tools mounted on said draft bar in vertically fixed depending positions and in laterally spaced relation with respect to each other for trimming the side walls of said bed, a tool rig frame positioned intermediate said pair of bed shaving tools and connected with said draft bar through a linkage affording vertical floating movement of said frame relative to said draft bar, one or more bed working tools mounted on said frame in vertically fixed relation thereto and positioned thereby between and in laterally spaced relation to said bed shaving tools, and a gauge element secured to said frame in contacting relation to said bed top surface and generally in the line of travel of said bed working tools so that the working depths of said bed working tools will be gauged automatically in accordance with vertical undulations of said bed top surface and independently of said up and down movements of said draft member and bed shaving tools.

3. A bed cultivating and shaving machine as set forth in claim 2 and further comprising means mounted on said tractor and operatively connected with said draft member for selectively adjusting the vertical position of the latter relative to said tractor, so that the working positions of said bed shaving tools may be adjusted independently of said bed working tools.

4. A bed cultivating and shaving machine comprising, in combination, a tractor mounting a pair of dirigible front wheels laterally spaced apart to travel in generally parallel ditches bounding one or more row crop beds underlying said tractor, an elongated draft member carried by a portion of said tractor adjacent the mounting of said wheels and positioned to extend laterally beneath said tractor portion in generally parallel relation to the axes of said wheels and in vertically spaced relation to the bottom surfaces of said ditches and to the top surface of a bed therebetween so that said draft member will be moved up and down in accordance with vertical undulations of said ditch bottom surfaces, a pair of bed shaving tools mounted on said draft member in vertically fixed depending positions and in laterally spaced relation with respect to each other for trimming the side walls of said bed, a tool rig frame positioned intermediate said pair of bed shaving tools and connected with said draft member through a linkage affording vertical floating movement of said frame relative to said draft member, means mounted on said tractor and operatively connected with said draft member for selectively adjusting the vertical position of the latter relative to said tractor, one or more bed working tools mounted on said frame in vertically fixed relation thereto and positioned thereby between and in laterally spaced relation to said bed shaving tools, and a gauge element positioned in contacting relation to said bed top surface generally in the line of travel of said bed working tools and mounted on said frame for selective adjustment thereon to different vertically fixed positions so that the working positions of said bed shaving tools and of said bed working tools may be adjusted independently of each other and so that the working depths of said bed working tools will be gauged automatically in response to vertical undulations of said bed top surface and independently of said up and down movements of said draft member and bed shaving tools.

5. A bed cultivating and shaving machine as set forth in claim 4 and wherein said tool rig frame is connected with said draft bar through a pair of upper and lower parallel links, and wherein said gauge element is mounted on said tool rig frame forwardly of said bed working tools.

References Cited in the file of this patent

UNITED STATES PATENTS

| Number | Name | Date |
|---|---|---|
| 1,850,717 | Heitshu | Mar. 22, 1932 |
| 1,946,403 | Johnson | Feb. 6, 1934 |
| 2,150,665 | Tuft | Mar. 14, 1939 |
| 2,228,172 | Luttichau | Jan. 7, 1941 |
| 2,349,343 | Graham | May 23, 1944 |
| 2,368,312 | Luger | Jan. 30, 1945 |
| 2,449,159 | Brown | Sept. 14, 1948 |

FOREIGN PATENTS

| Number | Country | Date |
|---|---|---|
| 248,933 | Great Britain | Mar. 18, 1926 |
| 886,890 | France | July 19, 1943 |